United States Patent
Toda et al.

(10) Patent No.: US 9,885,979 B2
(45) Date of Patent: Feb. 6, 2018

(54) TONER FILLING APPARATUS

(71) Applicant: KONICA MINOLTA, INC., Chiyoda-ku, Tokyo (JP)

(72) Inventors: Toru Toda, Hyogo (JP); Katsumi Tashiro, Kobe (JP); Takeshi Arai, Akashi (JP); Masaaki Kondo, Hino (JP); Kiyotaka Naito, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/071,866

(22) Filed: Mar. 16, 2016

(65) Prior Publication Data

US 2016/0274497 A1 Sep. 22, 2016

(30) Foreign Application Priority Data

Mar. 17, 2015 (JP) .................. 2015-052800

(51) Int. Cl.
*G03G 15/08* (2006.01)
*B65B 1/16* (2006.01)

(52) U.S. Cl.
CPC .......... *G03G 15/0894* (2013.01); *B65B 1/16* (2013.01); *G03G 2215/066* (2013.01); *G03G 2215/0875* (2013.01)

(58) Field of Classification Search
CPC ........... G03G 15/0894; G03G 15/0865; G03G 2215/0875; G03G 2215/066; B65G 1/16; B65G 39/04

(Continued)

(56) References Cited

U.S. PATENT DOCUMENTS 5,226,863 A * 7/1993 Kimura ............... B65B 1/12
 141/8
5,711,353 A * 1/1998 Ichikawa .............. B65B 1/26
 141/12

(Continued)

FOREIGN PATENT DOCUMENTS

DE 3703714 A1 * 8/1988 ............... B65B 1/18
EP 1 055 601 A2 11/2000

(Continued)

OTHER PUBLICATIONS

The extended European Search Report dated Jul. 27, 2016, by the European Patent Office in corresponding European Patent Application No. 16157169.0-1708. (7 pages).

(Continued)

*Primary Examiner* — Robert Beatty
(74) *Attorney, Agent, or Firm* — Buchanan Ingersoll & Rooney PC

(57) ABSTRACT

A toner filling apparatus includes a filling tank, a toner filling path forming member, a toner fluidizing unit, a filling path opening/closing unit and a container room sucking unit. The toner filling path forming member is in communication with the filling tank and forms a toner filling path connected to the toner container. The container room sucking unit sucks air from the toner container through a filter member which is impermeable to the toner but permeable to air. When the toner fluidizing unit fluidizes the toner in the filling tank and the filling path opening/closing unit opens the toner filling path so as to load the toner to the toner container, the container room sucking unit reduces a pressure in the toner container to a negative pressure so as to draw in the toner into the toner container.

12 Claims, 5 Drawing Sheets

(58) Field of Classification Search
USPC ........ 399/252, 258, 262; 141/59, 67, 70, 71, 141/80, 83, 260, 263
See application file for complete search history.

(56) References Cited

U.S. PATENT DOCUMENTS

| | | | | |
|---|---|---|---|---|
| 5,727,607 | A * | 3/1998 | Ichikawa | B65B 1/28 141/374 |
| 6,340,036 | B1 * | 1/2002 | Toyoizumi | B65B 1/12 141/275 |
| 6,648,029 | B1 * | 11/2003 | Amano | B65B 1/26 141/59 |
| 8,061,393 | B2 * | 11/2011 | Behar | B65B 3/16 141/20 |
| 2003/0155035 | A1 * | 8/2003 | Ichikawa | B65B 1/16 141/301 |
| 2004/0037591 | A1 * | 2/2004 | Schlageter | G03G 15/0865 399/258 |
| 2006/0191590 | A1 * | 8/2006 | Wegman | G03G 15/0855 141/65 |
| 2007/0157990 | A1 * | 7/2007 | Amano | B65B 1/16 141/83 |
| 2008/0053562 | A1 | 3/2008 | Federzoni et al. | |
| 2008/0175628 | A1 * | 7/2008 | Kita | G03G 15/0875 399/262 |
| 2008/0213003 | A1 * | 9/2008 | Sano | G03G 15/0855 399/258 |

FOREIGN PATENT DOCUMENTS

| | | | |
|---|---|---|---|
| EP | 1 334 906 A2 | | 8/2003 |
| EP | 1334906 A2 | | 8/2003 |
| EP | 1 475 672 A1 | | 11/2004 |
| GB | 2 297 304 A | | 7/1996 |
| JP | S54-29298 A | | 3/1979 |
| JP | H08-198202 A | | 8/1996 |
| JP | 10297769 A | * | 11/1998 |
| JP | 11236012 A | * | 8/1999 |
| JP | 2003095218 A | * | 4/2003 |
| JP | 2003-221003 A | | 8/2003 |
| JP | 3547730 B2 | | 7/2004 |
| JP | 2005075372 A | * | 3/2005 |
| JP | 2005-225511 A | | 8/2005 |
| JP | 2009-169271 A | | 7/2009 |
| JP | 2009269654 A | * | 11/2009 |
| WO | WO 2010043337 A1 | * | 4/2010 ............... B65B 1/28 |

OTHER PUBLICATIONS

Notification of Reasons for Refusal dated Mar. 7, 2017 issued by the Japanese Patent Office in corresponding Japanese Patent Application No. 2015-052800 and English translatiuon. (7 pages).

EP Office Action dated Aug. 23, 2017, by the European Patent Office in corresponding European Patent Application No. 16157169.0. (4 pgs).

* cited by examiner

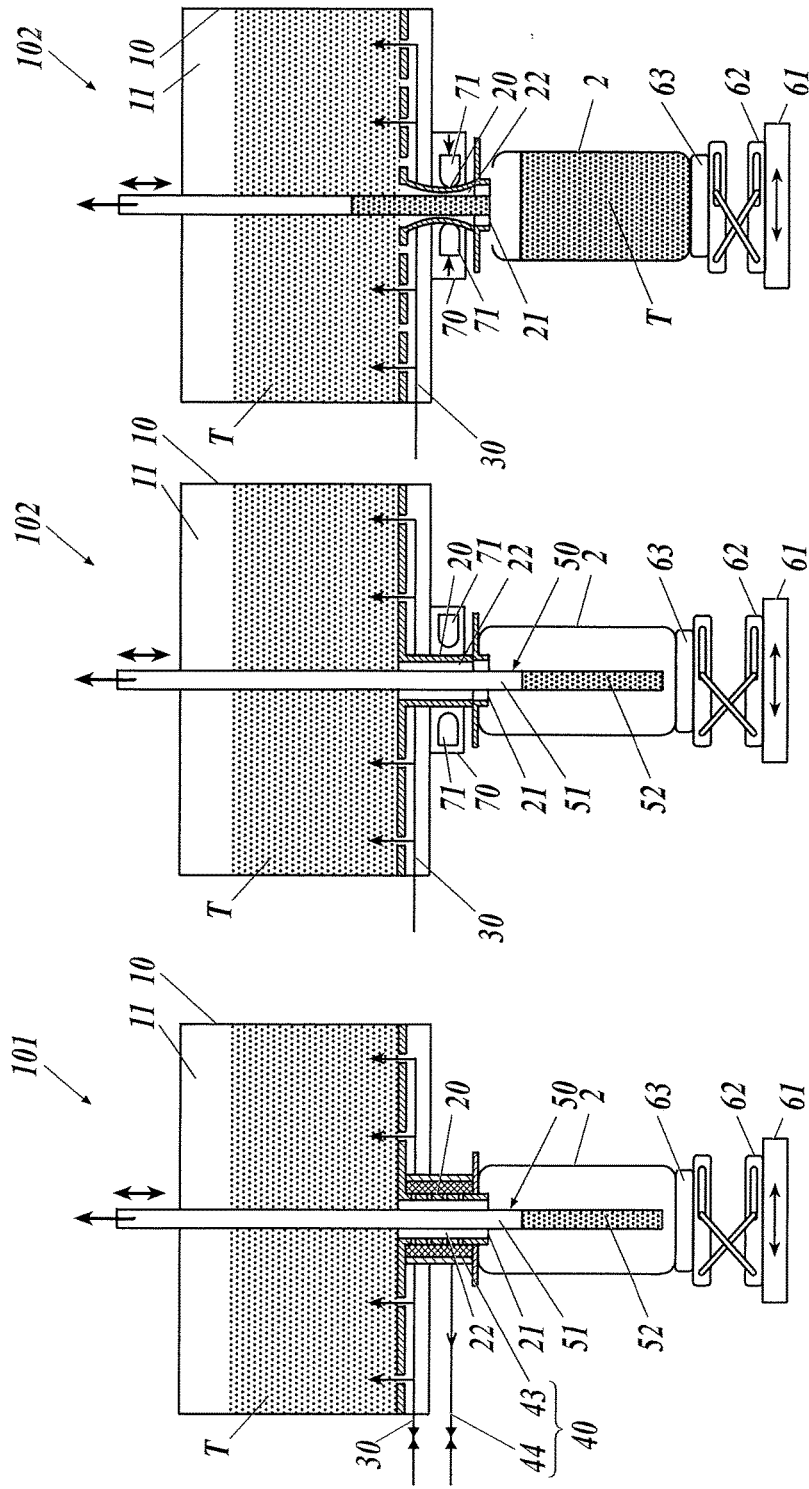

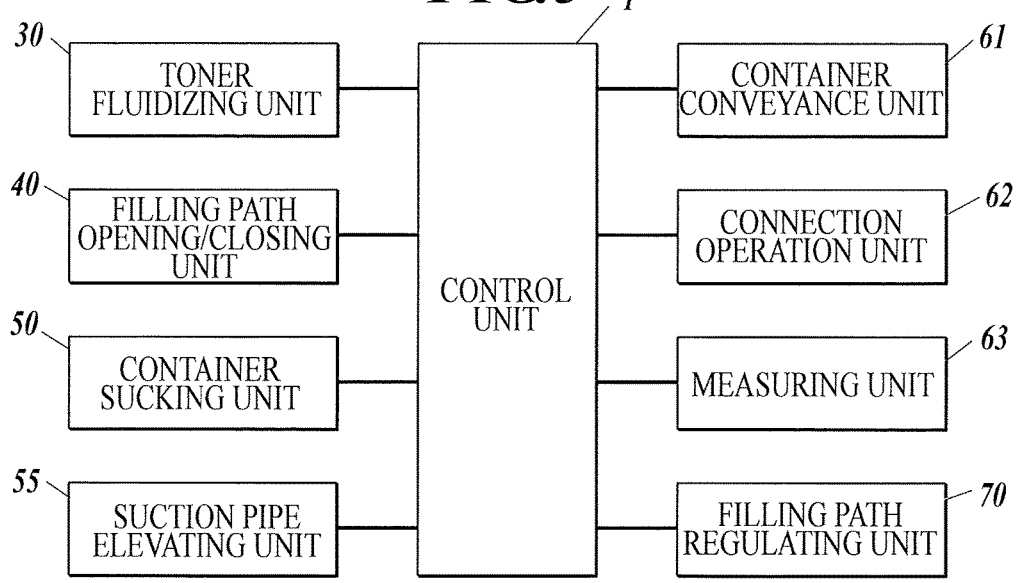
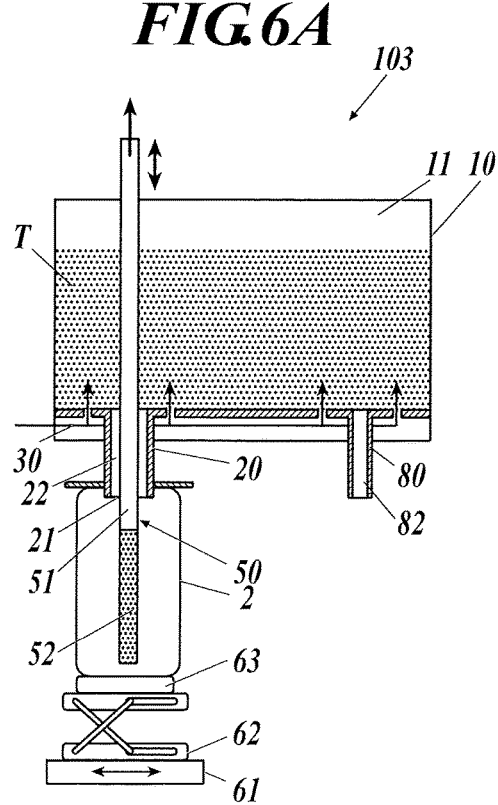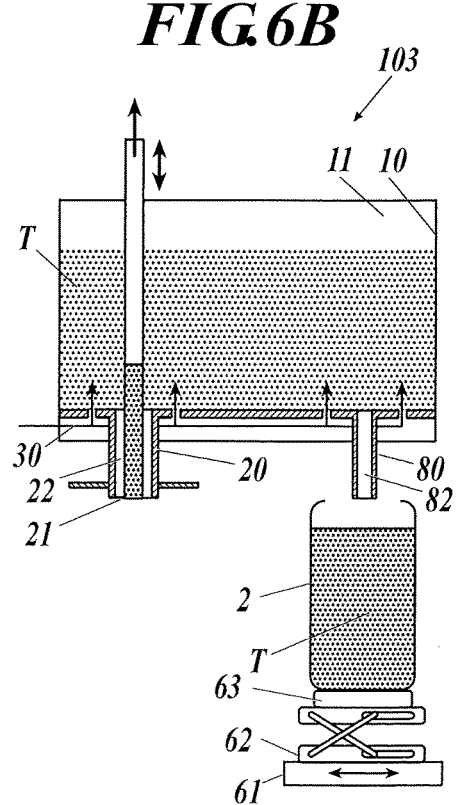

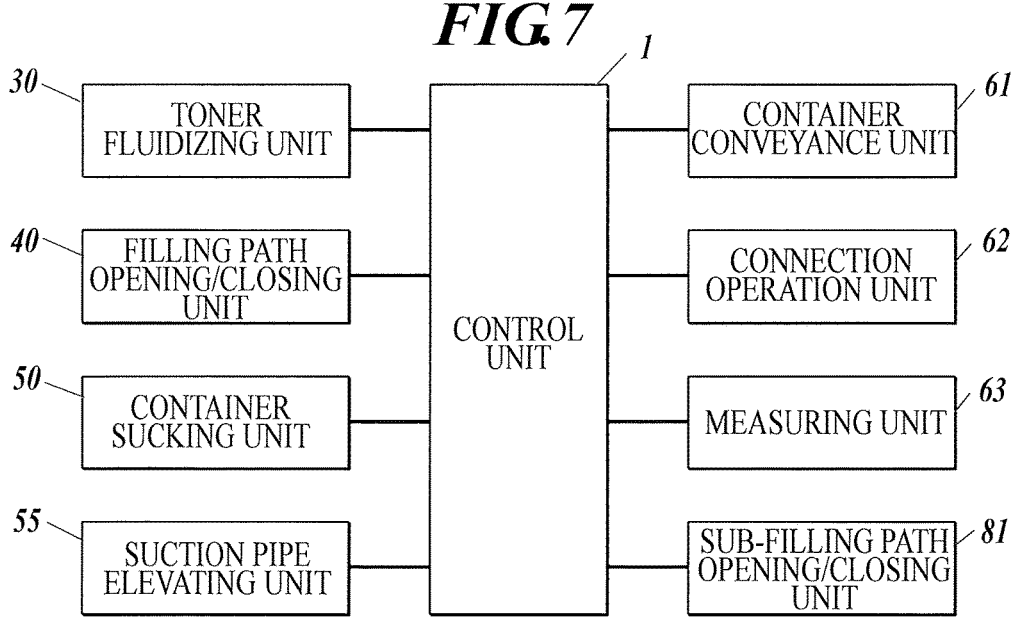
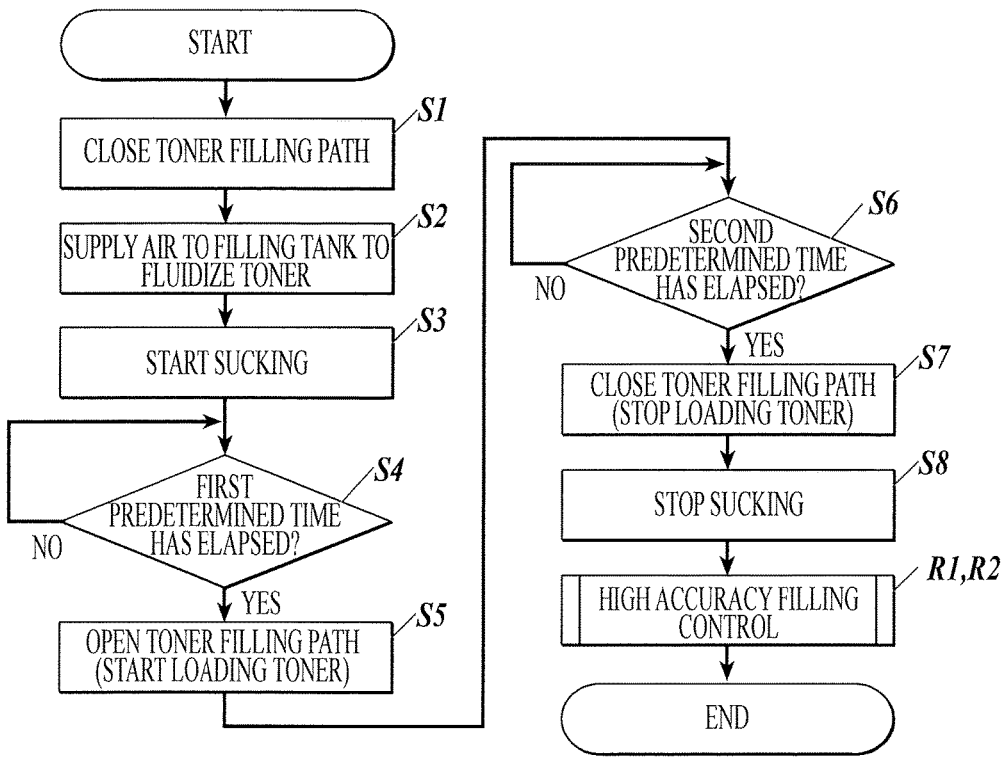

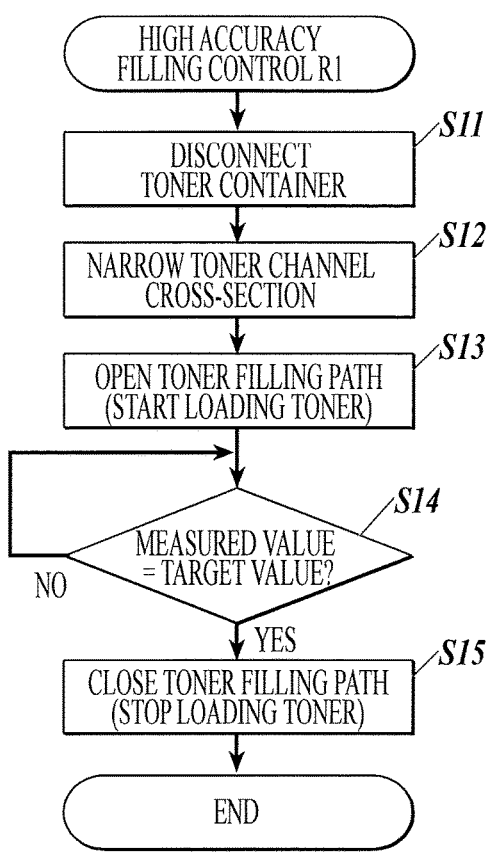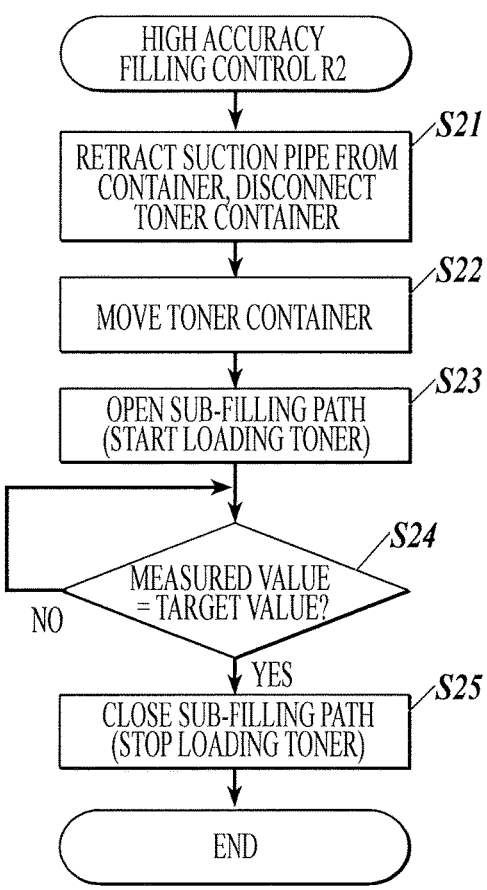

TONER FILLING APPARATUS

BACKGROUND OF THE INVENTION

1. Field of the Invention

The present invention relates to a toner filling apparatus that fills a container with toner.

2. Description of Related Art

Screw (auger) filling apparatuses have been proposed in order to rapidly fill a container with toner. However, when a screw is rotated at a high speed, toner is subjected to a large stress, which may cause a change in the properties such as occurrence of thermal aggregates. Therefore, such mechanical filling is not favorable.

JP 3547730B proposes a filling method that involves mixing toner with air to fluidize it.

In the invention described in JP 3547730B, after the air content of toner is stabilized in a measuring tank, an eject opening is opened by releasing an eject control member from an elastic ring that forms the eject opening in a sleeve located at the lower end of the measuring tank, so as to let the toner fall down to a small toner container through the eject opening. The aperture of the eject opening is regulated stepwise, and when the loaded toner reaches a specified amount, the eject opening is closed by fitting the eject control member in the elastic ring so as to stop the flow of the toner.

With the invention described in JP 3547730B, since no conveying member or stirring such as a screw is used, toner is subjected to less stress.

Further, in the invention described in JP 3547730B, air in the small toner container is sucked so that toner cloud of suspended toner is removed. For this purpose, a suction pipe is inserted in the small toner container, and only the air is sucked while the loaded toner particles are prevented from passing through the pipe. It is also described that an alternative sucking means may be disposed in the measuring tank (sleeve) instead of the suction pipe.

However, in the invention described in JP 3547730B, since the toner is loaded only by its free fall, the maximum filling speed is limited to a certain level. Furthermore, it takes considerable time to clear away toner cloud of suspended toner by sucking air in the small toner container by using the suction pipe inserted in the small toner container or a sucking means in the measuring tank, which results in the long cycle time of the filling process.

SUMMARY OF THE INVENTION

The present invention was made in view of the above-described problem with the prior art, and an object thereof is to provide a toner filling apparatus that can improve the filling speed and the filling density while maintaining the toner properties.

In order to realize the above object, according to a first aspect of the present invention, there is provided a toner filling apparatus, including:

a filling tank which stores toner to be supplied to a toner container;

a toner filling path forming member which is in communication with a toner storing room of the filling tank and which forms a toner filling path connected to an opening of the toner container;

a toner fluidizing unit which blows air into the toner in the filling tank to fluidize the toner;

a filling path opening/closing unit which opens and closes the toner filling path;

a container room sucking unit which sucks air from the toner container through a filter member, in which the filter member is impermeable to the toner but permeable to air; and a control unit which controls the toner fluidizing unit, the filling path opening/closing unit and the container room sucking unit, wherein the control unit performs a toner draw-in filling control in which when the control unit fluidizes the toner in the filling tank by the toner fluidizing unit and opens the toner filling path by the filling path opening/closing unit so as to load the fluidized toner from the filling tank to the toner container, the control unit reduces a pressure in the toner container to a negative pressure by the container room sucking unit so as to draw in the toner from the filling tank into the toner container by the negative pressure.

Preferably, in the toner draw-in filling control, the control unit starts suction by the container room sucking unit before the toner filling path is opened.

Preferably, in the toner draw-in filling control, the control unit continues suction by the container room sucking unit while the toner filling path is open, and then closes the toner filling path by the filling path opening/closing unit so as to terminate the toner draw-in filling control.

Preferably, the control unit controls the amount of toner to be loaded in the toner container by controlling a length of suction time for the toner.

Preferably, the filling path opening/closing unit comprises an elastomer member which closes the toner filling path.

Preferably, the filling path opening/closing unit closes the toner filling path by sucking air from a mixture of the toner and air in the toner filling path through a filter member to temporarily aggregate the residual toner, in which the filter member is impermeable to the toner but permeable to air.

Preferably, the toner filling apparatus further includes:

a filling path regulating unit which reduces or expands a toner channel cross-sectional area of the toner filling path;

a connection operation unit which controls a state between a connected state in which the toner filling path is airtightly connected to the opening of the toner container and a disconnected state in which the opening of the toner container is separated below from the toner filling path and is open to the air; and a measuring unit which measures a weight of the toner container, wherein the control unit controls the filling path regulating unit and the connection operation unit and also receives a signal representing a measured value by the measuring unit, wherein the control unit performs the toner draw-in filling control in which the toner channel cross-sectional area of the toner filling path is regulated to a comparatively large size by the filling path regulating unit and terminates the toner draw-in filling control before reaching a target value, and thereafter the control unit stops suction by the container room sucking unit, changes the state to the disconnected state by the connection operation unit, regulates the toner channel cross-sectional area of the toner filling path to a comparatively small size by the filling path regulating unit, opens the toner filling path by the toner filling path opening/closing unit so as to fill the toner container with the toner through the toner filling path until the measured value by the measuring unit reaches the target value.

Preferably, the toner filling apparatus further includes:

a sub-filling path forming member which is in communication with the toner storing room of the filling tank and which forms a sub-filling path that has a smaller toner channel cross-sectional area than the toner channel cross-sectional area of the toner filling path;

a sub-filling path opening/closing unit which opens and closes the sub-filling path; and a measuring unit which measures a weight of the toner container, wherein the control unit controls the sub-filling path opening/closing unit and also receives a signal representing a measured value by the measuring unit, wherein the control unit performs the toner draw-in filling control and terminates the toner draw-in filling control before reaching a target value, and thereafter the control unit stops suction by the container room sucking unit and opens the sub-filling path by the sub-filling path opening/closing unit so as to fill the toner container with the toner through the sub-filling path until the measured value by the measuring unit reaches the target value.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein:

FIG. 3 is a schematic front view of a toner filling apparatus according to a second embodiment of the present invention;

FIG. 4A is a schematic front view of a toner filling apparatus according to a third embodiment of the present invention;

FIG. 4B is a schematic front view of the toner filling apparatus according to the third embodiment of the present invention;

FIG. 5 is a block diagram of a control system of the toner filling apparatus according to the third embodiment of the present invention;

FIG. 6A is a schematic front view of a toner filling apparatus according to a fourth embodiment of the present invention;

FIG. 6B is a schematic front view of the toner filling apparatus according to the fourth embodiment of the present invention;

FIG. 7 is a block diagram of a control system of the toner filling apparatus according to the fourth embodiment of the present invention;

FIG. 8 is a flowchart of a toner draw-in filling control according to the third and fourth embodiments of the present invention;

FIG. 9 is a flowchart of a high accuracy filling control according to the third embodiment of the present invention; and FIG. 10 is a flowchart of a high accuracy filling control according to the fourth embodiment of the present invention.

DETAILED DESCRIPTION OF THE PREFERRED EMBODIMENT

Figure 1:
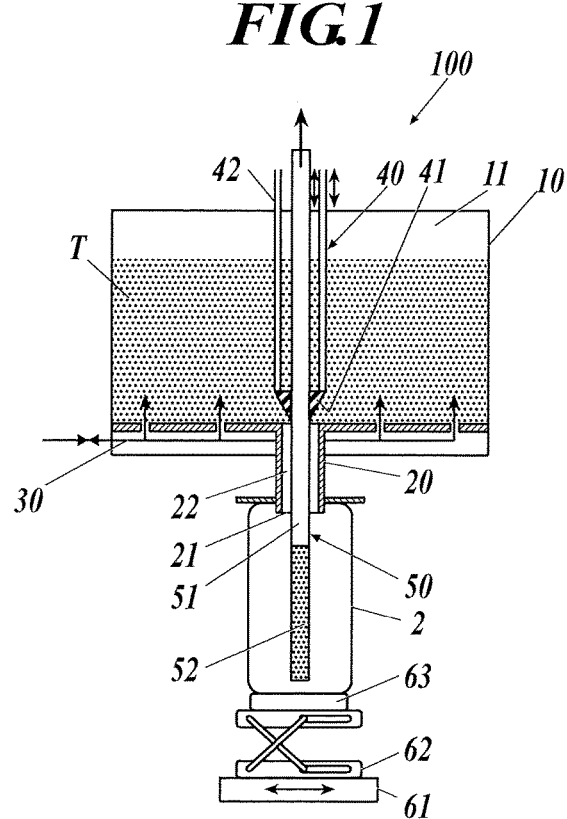
FIG. 1 is a schematic front view of a toner filling apparatus according to a first embodiment of the present invention.

Hereinafter, some embodiments of the present invention will be described referring to the drawings. The following description merely illustrates embodiments of the present invention, and it is not intended to limit the scope of the present invention.

First Embodiment

First, a toner filling apparatus according to a first embodiment of the present invention will be described.

Figure 2:
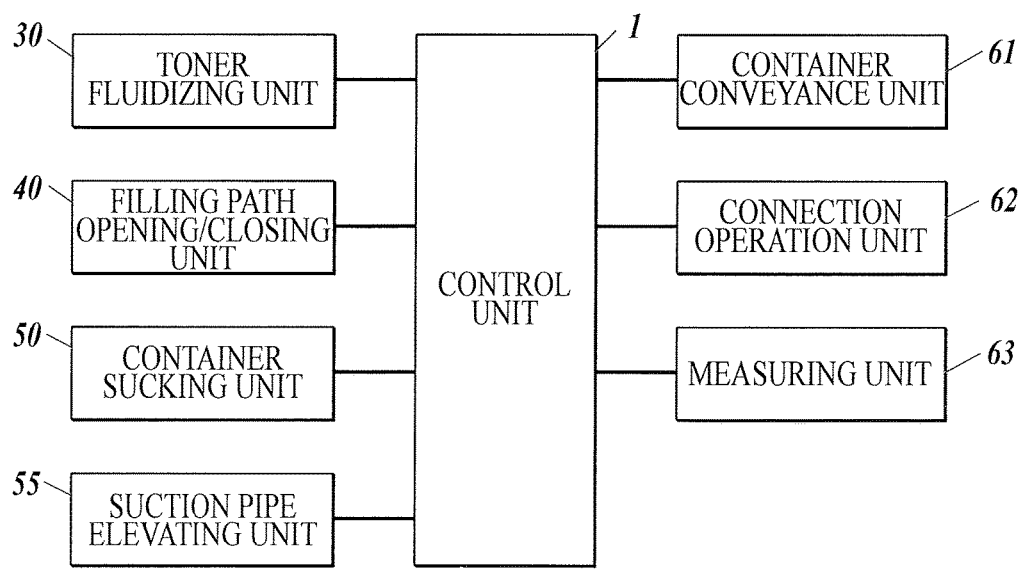
FIG. 2 is a block diagram of a control system of the toner filling apparatus according to the first embodiment of the present invention.

As illustrated in FIG. 1 and FIG. 2, the toner filling apparatus 100 of the present embodiment includes a filling tank 10, a toner filling path forming member 20, a toner fluidizing unit 30, a filling path opening/closing unit 40, a container room sucking unit 50 and a control unit 1. The control system of the toner filling apparatus 100 of the present embodiment is depicted in FIG. 2 as a block diagram.

The filling tank 10 stores toner T to be fed to a toner container 2. Although not shown in the figure, the toner is replenished to a toner storing room 11 of the filling tank 10 through a supply opening that is disposed in the side part or the like of the filling tank 10.

The toner filling path forming member 20 is constituted by a cylindrical member that is attached in the lower end of the filling tank 10 or is formed as a part of the lower end portion of the filling tank 10. The toner filling path forming member 20 forms the toner filling path 22 in which the lower end is configured to be connected to an opening of a toner container and serves as a toner eject opening 21, and the upper end is in communication with the toner storing room 11. The toner filling path forming member 20 may have any shape such as a tapered shape.

The toner fluidizing unit 30 includes a filter member that is disposed on a wall defining the toner storing room 11, an air supply path for blowing air to the toner T in the filling tank 10 through the filter member so as to fluidize the toner T, and the like. The filter member is impermeable to toner but permeable to air, which is made of a porous material or the like.

In the present embodiment, the filling path opening/closing unit 40 includes a filling path closing member (elastomer member) 41, a coupling member 42 and an actuator (not shown). The filling path opening/closing unit 40 is configured such that the filling path closing member 41 moves up and down. The filling path closing member 41, which is disposed in the filling tank 10, moves down to fit in the toner filling path 22 so as to close the toner filling path 22 or moves up to open the toner filling path 22. The filling path closing member 41 is made of an elastomer. Since an elastomer for the filling path closing member 41 is used instead of conveyance or stirring member such as a screw, the toner T is subjected to less stress when the filling path closing member 41 moves up and down, and the properties of the toner T can therefore be maintained.

The container room sucking unit 50 includes a suction pipe 51 and a filter member 52 disposed at the lower end of the suction pipe 51. The container room sucking unit 50 sucks air through the filter member 52 and the hollow of the suction pipe 51. Further, the suction pipe 51 moves up and down by a suction pipe elevating unit 55 including an actuator (not shown).

In the present embodiment, the suction pipe 51 is disposed so as to run through the toner filling path 22. For this configuration, the filling path closing member 41 has a hole for the suction pipe 51. Alternatively, the suction pipe 51 may be disposed side by side with the toner filling path 22. In this case, it is not required to provide the hole for the suction pipe 51 in the filling path closing member 41. The filter member 52 is impermeable to toner but permeable to air, which is made of a porous material or the like.

The container room sucking unit 50 sucks air from the toner container 2 through the filter member 52 when the opening of the toner container 2 is airtightly connected to the toner filling path 22 and the lower end of the suction pipe 51 with the filter member 52 is moved down and inserted in the toner container 2 as illustrated in FIG. 1.

The toner filling apparatus 100 further includes a container conveyance unit 61, a connection operation unit 62 and a measuring unit 63.

The container conveyance unit 61 includes, for example, a horizontally movable table, a guide rail, a timing belt, a pulley, a stepping motor and the like.

The measuring unit 63, which is constituted by a digital scale, measures the weight of the toner container 2. The weight is measured for the purpose of controlling the amount of content in the toner container 2 (the weight of toner filled).

The connection operation unit 62 is constituted by, for example, an elevator. The elevator and the measuring unit 63 are mounted on the container conveyance unit 61, and the toner container 2 is mounted thereon. When the toner container 2 is set below the toner filling path 22 by the container conveyance unit 61, the toner container 2 can be set to a connected state by moving the toner container 2 upward with the elevator, in which the toner filling path 22 is airtightly connected to the opening of the toner container 2. Thereafter, the toner container 2 can be set to a disconnected state by moving the toner container 2 downward with the elevator, in which the opening of the toner container 2 is separated below from the toner filling path 22 and is open to the air. The connection operation unit 62 controls the state between the connected state and the disconnected state. The function of the connection operation unit 62 may be achieved by moving up and down the lower end of the toner filling path 22. To ensure the airtight connection, a connector member (sealing member) of an elastomer is provided around the lower end opening of the toner filling path 22.

The control unit 1 controls the toner fluidizing unit 30, the filling path opening/closing unit 40, the container room sucking unit 50, the suction pipe elevating unit 55, the container conveyance unit 61 and the connection operation unit 62. The control unit 1 also receives a signal representing the measured value by the measuring unit 63. The control unit 1 may be constituted by a computer that includes a processor, a storage device and the like. The processor executes a program stored in the storage device so as to achieve a function of performing a toner filling control, which is described below.

The toner filling control in the toner filling apparatus 100 according to the present embodiment will be described below.

Second Embodiment

Next, a toner filling apparatus according to a second embodiment of the present invention will be described.

As illustrated in FIG. 3, the toner filling apparatus 101 of the present embodiment has the same configuration as the above-described toner filling apparatus 100 of the first embodiment. However, the configuration of a filling path opening/closing unit 40 is changed from that of the first embodiment. The control system of the toner filling apparatus 101 of the present embodiment is illustrated in FIG. 2 as a block diagram.

The filling path opening/closing unit 40 according to the second embodiment of the present invention does not include the components corresponding to the filling path closing member 41 and the coupling member 42 of the first embodiment.

The filling path opening/closing unit 40 according to the second embodiment of the present invention includes a filter member 43, an air intake/supply path 44 and the like.

The filter member 43 is impermeable to toner but permeable to air, which is made of a porous material or the like. The filling path opening/closing unit 40 closes a toner filling path 22 by sucking the air from a mixture of toner T and air in the toner filling path 22 through the filter member 43 so as to temporarily aggregate the residual toner. Thereafter, the filling path opening/closing unit 40 opens the toner filling path 22 by stopping the suction (and further supplying air into the toner filling path 22). Since even an elastomer is not used for closing the toner filling path 22, the toner T is subjected to further less stress compared to the first embodiment, and the properties of the toner T can therefore be maintained.

A toner filling control in the toner filling apparatus 101 according to the present embodiment will be described below.

Third Embodiment

Next, a toner filling apparatus according to a third embodiment of the present invention will be described.

As illustrated in FIG. 4 and FIG. 5, the toner filling apparatus 102 of the present embodiment has the same configuration as the toner filling apparatus 100 of the first embodiment or the toner filling apparatus 101 of the second embodiment, and additionally includes a filling path regulating unit 70. The control system of the toner filling apparatus 102 of the present embodiment is illustrated in FIG. 5 as a block diagram. The control unit 1 controls the filling path regulating unit 70.

Although a filling path opening/closing unit 40 is not shown in FIG. 4, the toner filling apparatus 102 includes the same filling path opening/closing unit 40 as that of the first or second embodiment.

The filling path regulating unit 70 has a mechanism that moves a pressing member 71 in the radial direction of the toner filling path forming member 20. The pressing member 71 is configured to press the toner filling path forming member 20 from the outside. The toner filling path forming member 20 is made of an elastomer. The filling path regulating unit 70 reduces the toner channel cross-sectional area of the toner filling path 22 by pressing and shrinking the toner filling path forming member 20 by using the pressing member 71. Thereafter, the filling path regulating unit 70 expands the toner channel cross-sectional area of the toner filling path 22 by retracting the pressing member 71 from the toner filling path forming member 20 in the radial direction so as to let the toner filling path forming member 20 recover its original shape by elastic recovery. To reduce the toner channel cross-sectional area of the toner filling path 22, the pressing member 71 presses the toner filling path forming member 20 from the outside and does not come in contact with the toner. This can reduce the stress applied to the toner T, and the properties of the toner T can therefore be maintained.

A toner filling control in the toner filling apparatus 102 according to the present embodiment will be described below.

Fourth Embodiment

Next, a toner filling apparatus according to a fourth embodiment of the present invention will be described.

As illustrated in FIG. 6 and FIG. 7, the toner filling apparatus 103 of the present embodiment has the same configuration as the above-described toner filling apparatus 100 of the first embodiment or the toner filling apparatus 101 of the second embodiment and additionally includes a sub-filling path forming member 80 and a sub-filling path opening/closing unit 81. The control system of the toner filling apparatus 102 of the present embodiment is illustrated in FIG. 7 as a block diagram. A control unit 1 controls the sub-filling path opening/closing unit 81.

Although a filling path opening/closing unit 40 is not shown in FIG. 6, the toner filling apparatus 102 includes the same filling path opening/closing unit 40 as that of the first or second embodiment. Also, although the sub-filling path opening/closing unit 81 is not shown in FIG. 6, the sub-filling path opening/closing unit 81 has the same configuration as the filling path opening/closing unit 40.

As with a toner filling path forming member 20, the sub-filling path forming member 80 is constituted by a cylindrical member that is attached in the lower end of the filling tank 10 or is formed as a part of the lower end portion of the filling tank 10. The sub-filling path forming member 80 forms a sub-filling path 82 in which the lower end serves as a toner eject opening for ejecting the toner toward the opening of a toner container and the upper end is in communication with a toner storing room 11. The sub-filling path forming member 80 may have any shape such as a tapered shape.

The toner channel cross-sectional area of the sub-filling path 82 is smaller than the toner channel cross sectional area of the toner filling path 22. Accordingly, by using the sub-filling path 82, the filling apparatus 103 can eject a smaller fraction of toner compared to filling the container with the toner by using the toner filling path 22. Since the toner filling path 22 and the sub-filling path 82 are not deformed, the toner T is subjected to less stress, and the properties of the toner T can therefore be maintained.

A toner filling control in the toner filling apparatus 103 according to the present embodiment will be described below.

Toner Filling Control

Next, a toner filling control in the above-described toner filling apparatuses 100 to 103 will be described.

Toner Filling Control in Toner Filling Apparatus 102

First, a toner filling control in the toner filling apparatus 102 will be described referring to FIG. 8 and FIG. 9.

The control unit 1 of the toner filling apparatus 102 firstly closes the toner filling path 22 by the filling path opening/closing unit 40 (Step S1) and supplies air into the filling tank 10 by the toner fluidizing unit 30 so as to fluidize the toner T in the filling tank 10 (Step S2). In this condition, the control unit 1 starts to suck air from the toner container 2 by the container room sucking unit 50 (Step S3). As a result, the pressure in the toner container 2 is reduced to a negative pressure.

Before starting the suction by the container room sucking unit 50, the control unit 1 controls the suction pipe elevating unit 55, the container conveyance unit 61 and the connection operation unit 62 to set the toner container 2 mounted on the measuring unit 63 below the toner filling path 22 and then to move the toner container 2 upward so as to connect the opening of the toner container 2 to the toner filling path 22. At the same time, the control unit 1 controls these components to move the suction pipe 51 downward to insert it into the toner container 2. As a result, the filter member 52 is set in the toner container 2.

After a first predetermined time has elapsed since the suction is started in step S3 (Step S4, Yes), the control unit 1 of the toner filling apparatus 102 opens the toner filling path 22 by the filling path opening/closing unit 40 so as to start to fill the toner container 2 with the toner through the toner filling path 22 (Step S5).

After a second predetermined time has elapsed since the toner filling is started in Step S5 (Step S6, Yes), the control unit 1 of the toner filling apparatus 102 closes the toner filling path 22 by the filling path opening/closing unit 40 so as to stop filling the toner container 2 with the toner through the toner filling path 22 (Step S7). Also, the control unit 1 stops the suction by the container room sucking unit 50 (Step S8).

As described above, the control unit 1 of the toner filling apparatus 102 fluidizes the toner T in the filling tank 10 by the toner fluidizing unit 30 and then opens the toner filling path 22 by the filling path opening/closing unit 40 to load the fluidized toner T from the filling tank 10 to the toner container 2. At the same time, the control unit 1 reduces the pressure in the toner container 2 to a negative pressure by the container room sucking unit 50 so as to draw the toner T from the filling tank 10 into the toner container 2 by the negative pressure. In this way, the control unit 1 performs a toner draw-in filling control.

The first predetermined time corresponds to the time for charging the negative pressure in the toner container 2 before starting the filling. That is, in the toner draw-in filling control, the control unit 1 starts the suction by the container room sucking unit 50 before opening the toner filling path 22. Evacuating the air in the toner container 2 before starting the filling enables providing a large negative pressure and thereby achieving the high filling speed from the beginning of the filling. Therefore, the filling time can be reduced. When the first predetermined time is set within the time in which the empty toner container 2 moves to be connected to the toner filling path 22, the operation efficiency can be kept high.

The second predetermined time corresponds to the filling time of the toner container 2 with the toner and also corresponds to the suction time for the toner.

The control unit 1 does not perform variable control of the negative pressure in the toner container 2, i.e. stabilizes it to a certain level, but performs variable control of the length of the second predetermined time, so as to control the amount of toner filled in the toner container 2 with high accuracy even when the capacity of the toner container 2 is changed. This facilitates controlling the amount of toner filled in the toner container 2 with high accuracy.

Further, in the toner draw-in filling control as described above, the control unit 1 continues the suction by the container room sucking unit 50 while the toner filling path 22 is open (Step S5 to Step S7, during the second predetermined time). Then, the control unit 1 closes the toner filling path 22 by the filling path opening/closing unit 40 so as to terminate the toner draw-in filling control.

This can improve the filling speed and the filling density.

Then, the control unit 1 of the toner filling apparatus 102 performs the following high accuracy filling control R1 and thus complete one cycle of the toner filling control. FIG. 9 illustrates the flow of the high accuracy filling control R1.

In the high accuracy filling control R1, the control unit 1 of the toner filling apparatus 102 firstly changes the state of the toner container 2 to the disconnected state by the connection operation unit 62 (Step S11).

As illustrated in FIG. 4B, the control unit 1 of the toner filling apparatus 102 regulates the toner channel cross-sectional area of the toner filling path 22 to a comparatively small size by the filling path regulating unit 70 (Step S12). The control unit 1 then opens the toner filling path 22 by the filling path opening/closing unit 40 so as to start to fill the toner container 2 with the toner through the toner filling path 22 (Step S13). As used herein, regulating the toner channel cross-sectional area to a comparatively small size means that the toner channel cross-sectional area of the toner filling path 22 is reduced to a size smaller than the size during the above-described open period (Step S5 to Step S7, during the second predetermined time).

Then, when the measured value of the measuring unit 63 reaches a target value (Step S14, Yes) while the toner filling path 22 is open by the filling path opening/closing unit 40, the control unit 1 of the toner filling apparatus 102 closes the toner filling path 22 by the filling path opening/closing unit 40 so as to stop filling the toner container 2 with the toner through the toner filling path 22 (Step S15).

This means that the above-described toner draw-in filling control (Step S1 to Step S7) was terminated before reaching the target value. As used herein, the target value refers to a final target amount of toner to be loaded in the toner container 2, and the target amount of toner loaded for the toner draw-in filling control (Step S1 to Step S7) is set to a value lower than this final target value.

That is, the control unit 1 of the toner filling apparatus 102 performs the toner draw-in filling control (Step S1 to Step S7) in which the toner channel cross-sectional area of the toner filling path 22 is regulated to a comparatively large size by the filling path regulating unit 70 as illustrated in FIG. 4A. The control unit 1 terminates this toner draw-in filling control (Step S1 to Step S7) before reaching the target value, and thereafter stops the suction by the container room sucking unit 50 and changes the state to the disconnected state by the connection operation unit 62 in Step S8 and Step S11. The control unit 1 then regulates the toner channel cross-sectional area of the toner filling path 22 to a comparatively small size by the filling path regulating unit 70 as illustrated in FIG. 4B (Step S12) and opens the toner filling path 22 by the filling path opening/closing unit 40 so as to fill the toner container 2 with the toner through the toner filling path 22 until the measured value by measuring unit 63 reaches the target value (Step S13 to Step S15).

By performing the toner draw-in filling control (Step S1 to Step S7) and the following high accuracy filling control R1, the toner filling with high speed, high density and high accuracy is achieved.

Toner Filling Control in Toner Filling Apparatus 103

The toner filling control in the toner filling apparatus 103 will be described referring to FIG. 8 and FIG. 10.

The control unit 1 of the toner filling apparatus 103 performs the Step S1 to Step S8 in FIG. 8 with the same condition that the control is terminated before reaching the target value, and then performs the high accuracy filling control R2 as described below. The control unit 1 thus completes a cycle of the toner filling control. FIG. 10 illustrates the flow of the high accuracy filling control R2.

In the high accuracy filling control R2, the control unit 1 of the toner filling apparatus 103 firstly moves the suction pipe 51 upward by the suction pipe elevating unit 55 to retract it to a position above the upper end of the toner container 2 and also changes the state of the toner container 2 to the disconnected state by the connection operation unit 62 (Step S21).

As illustrated in FIG. 6B, the control unit 1 of the toner filling apparatus 103 moves the toner container 2 to a position below the sub-filling path forming member 80 by the container conveyance unit 61 (Step S22).

The control unit 1 of the toner filling apparatus 103 opens the sub-filling path 82 by the sub-filling path opening/closing unit 81 so as to start to fill the toner container 2 with the toner through the sub-filling path 82 (Step S23).

Then, when the measured value by the measuring unit 63 reaches the target value while the sub-filling path 82 is opened by the sub-filling path opening/closing unit 81 (Step S24, Yes), the control unit 1 of the toner filling apparatus 103 closes the sub-filling path 82 by the sub-filling path opening/closing unit 81 so as to stop filling the toner container 2 with the toner through the sub-filling path 82 (Step S25).

That is, the control unit 1 of the toner filling apparatus 103 performs the toner draw-in filling control (Step S1 to Step S7) in the condition illustrated in FIG. 6A. The control unit 1 terminates this toner draw-in filling control (Step S1 to Step S7) before reaching the target value, and thereafter stops the suction by the container room sucking unit 50, retracts the suction pipe 51 (pulls it out of the container) and changes the state to the disconnected state by the connection operation unit 62 in Step S8 and Step S21. The control unit 1 then opens the sub-filling path 82 by the sub-filling path opening/closing unit 81 so as to fill the toner container 2 with the toner through the sub-filling path 82 until the measured value by the measuring unit 63 reaches the target value (Step S22 to Step S25).

When the toner filling path forming member 20 and the sub-filling path forming member 80 are closely arranged so that they are located within the size of the opening of the toner container 2, the above-described moving step (Step S22) is not required. In this case, the toner container 2 may have different openings respectively for the toner filling path forming member 20 and the sub-filling path forming member 80.

By performing the toner draw-in filling control (Step S1 to Step S7) and the following high accuracy filling control R2, the toner filling with high speed, high density and high accuracy is achieved.

Toner Filling Control in Toner Filling Apparatuses 100, 101

The toner filling control by the control unit 1 of the toner filling apparatuses 100, 101 involves the above-described control (Step 1 to Step 8) that are described referring to FIG. 8, in which the target value for the control is set to the final target amount of the toner to be loaded in the toner container 2. The toner filling apparatus 100, 101 do not perform the above-described high accuracy filling controls.

This U.S. patent application claims priority to Japanese patent application No. 2015-052800 filed on Mar. 17, 2015, the entire contents of which are incorporated by reference herein for correction of incorrect translation.

What is claimed is:
1. A toner filling apparatus, comprising:
    a filling tank which stores toner to be supplied to a toner container;
    a toner filling path forming member which is in communication with a toner storing room of the filling tank and which forms a toner filling path connected to an opening of the toner container;
    a toner fluidizing unit which blows air into the filling tank to fluidize the toner;

a filling path opening/closing unit which opens and closes the toner filling path;

a container room sucking unit which sucks air from the toner container through a filter member, in which the filter member is impermeable to the toner but permeable to air;

a filling path regulating unit which reduces or expands a toner channel cross-sectional area of the toner filling path;

a connection operation unit which controls a state between a connected state in which the toner filling path is connected in an airtight manner to the opening of the toner container and a disconnected state in which the opening of the toner container is separated below from the toner filling path and is open to the air;

a measuring unit which measures a weight of the toner container; and a control unit which controls the toner fluidizing unit, the filling path opening/closing unit, the container room sucking unit, the filling path regulating unit, and the connection operation unit, and also receives a signal representing a measured value by the measuring unit, wherein the control unit 1) performs a toner draw-in filling control in which when the control unit fluidizes the toner in the filling tank by the toner fluidizing unit and opens the toner filling path by the filling path opening/closing unit so as to load the fluidized toner from the filling tank to the toner container, the control unit reduces a pressure in the toner container to a negative pressure by the container room sucking unit so as to draw in the toner from the filling tank into the toner container by the negative pressure, and in which the toner channel cross-sectional area of the toner filling path is regulated to a comparatively large size by the filling path regulating unit, and 2) terminates the toner draw-in filling control by closing the toner filling path before the measured value reaches a target value, and wherein, after termination of the toner draw-in filling control, the control unit stops suction by the container room sucking unit, changes the state to the disconnected state by the connection operation unit, regulates the toner channel cross-sectional area of the toner filling path to a comparatively small size by the filling path regulating unit, and opens the toner filling path by the toner filling path opening/closing unit so as to fill the toner container with the toner through the toner filling path until the measured value by the measuring unit reaches the target value.

2. The toner filling apparatus according to claim 1, wherein in the toner draw-in filling control, the control unit continues suction by the container room sucking unit while the toner filling path is open, and then closes the toner filling path by the filling path opening/closing unit so as to terminate the toner draw-in filling control.

3. The toner filling apparatus according to claim 1, wherein the control unit controls the amount of toner to be loaded in the toner container by controlling a length of suction time for the toner.

4. The toner filling apparatus according to claim 1, wherein the filling path opening/closing unit comprises an elastomer member which closes the toner filling path.

5. The toner filling apparatus according to claim 1, wherein the filling path opening/closing unit closes the toner filling path by sucking air from a mixture of the toner and air in the toner filling path through a filter member to temporarily aggregate the residual toner, in which the filter member is impermeable to the toner but permeable to air.

6. The toner filling apparatus according to claim 1, wherein in the toner draw-in filling control, the control unit starts suction by the container room sucking unit before the toner filling path is opened.

7. A toner filling apparatus, comprising:

a filling tank which stores toner to be supplied to a toner container;

a toner filling path forming member which is in communication with a toner storing room of the filling tank and which forms a toner filling path connected to an opening of the toner container;

a toner fluidizing unit which blows air into the filling tank to fluidize the toner;

a filling path opening/closing unit which opens and closes the toner filling path;

a container room sucking unit which sucks air from the toner container through a filter member, in which the filter member is impermeable to the toner but permeable to air;

a control unit which controls the toner fluidizing unit, the filling path opening/closing unit and the container room sucking unit, wherein the control unit performs a toner draw-in filling control in which when the control unit fluidizes the toner in the filling tank by the toner fluidizing unit and opens the toner filling path by the filling path opening/closing unit so as to load the fluidized toner from the filling tank to the toner container, the control unit reduces a pressure in the toner container to a negative pressure by the container room sucking unit so as to draw in the toner from the filling tank into the toner container by the negative pressure, a sub-filling path forming member which is in communication with the toner storing room of the filling tank and which forms a sub-filling path that has a smaller toner channel cross-sectional area than the toner channel cross-sectional area of the toner filling path;

a sub-filling path opening/closing unit which opens and closes the sub-filling path; and a measuring unit which measures a weight of the toner container, wherein the control unit controls the sub-filling path opening/closing unit and also receives a signal representing a measured value by the measuring unit, wherein the control unit performs the toner draw-in filling control and terminates the toner draw-in filling control before reaching a target value, and thereafter the control unit stops suction by the container room sucking unit and opens the sub-filling path by the sub-filling path opening/closing unit so as to fill the toner container with the toner through the sub-filling path until the measured value by the measuring unit reaches the target value.

8. The toner filling apparatus according to claim 7, wherein in the toner draw-in filling control, the control unit starts suction by the container room sucking unit before the toner filling path is opened.

9. The toner filling apparatus according to claim 7, wherein in the toner draw-in filling control, the control unit continues suction by the container room sucking unit while the toner filling path is open, and then closes the toner filling path by the filling path opening/closing unit so as to terminate the toner draw-in filling control.

10. The toner filling apparatus according to claim 7, wherein the control unit controls the amount of toner to be loaded in the toner container by controlling a length of suction time for the toner.

11. The toner filling apparatus according to claim 7, wherein the filling path opening/closing unit comprises an elastomer member which closes the toner filling path.

12. The toner filling apparatus according to claim 7, wherein the filling path opening/closing unit closes the toner filling path by sucking air from a mixture of the toner and air in the toner filling path through a filter member to temporarily aggregate the residual toner, in which the filter member is impermeable to the toner but permeable to air.

* * * * *